(12) United States Patent
Lee (10) Patent No.: US 11,522,842 B2
(45) Date of Patent: Dec. 6, 2022

(54) CENTRAL TRUST HUB FOR INTERCONNECTIVITY DEVICE REGISTRATION AND DATA PROVENANCE

(71) Applicant: Seagate Technology LLC, Cupertino, CA (US)

(72) Inventor: Nyuk Fah Alice Lee, Singapore (SG)

( * ) Notice: Subject to any disclaimer, the term of this patent is extended or adjusted under 35 U.S.C. 154(b) by 118 days.

(21) Appl. No.: 16/719,333

(22) Filed: Dec. 18, 2019

(65) Prior Publication Data

US 2021/0194860 A1  Jun. 24, 2021

(51) Int. Cl.
| | |
|---|---|
| H04L 9/40 | (2022.01) |
| G06F 3/06 | (2006.01) |
| H04L 67/12 | (2022.01) |
| G06F 21/44 | (2013.01) |
| G06F 21/62 | (2013.01) |
| G06F 21/60 | (2013.01) |

(52) U.S. Cl.
CPC ........ *H04L 63/0471* (2013.01); *G06F 3/0604* (2013.01); *G06F 3/0659* (2013.01); *G06F 3/0679* (2013.01); *G06F 21/44* (2013.01); *G06F 21/602* (2013.01); *G06F 21/6254* (2013.01); *H04L 63/0853* (2013.01); *H04L 67/12* (2013.01)

(58) Field of Classification Search
CPC combination set(s) only.
See application file for complete search history.

(56) References Cited

U.S. PATENT DOCUMENTS

| | | | |
|---|---|---|---|
| 9,497,196 B2 | 11/2016 | Kim et al. | |
| 9,876,823 B2 | 1/2018 | Smith et al. | |
| 9,985,946 B2 | 5/2018 | Smith et al. | |
| 10,346,614 B1* | 7/2019 | Ko | H04L 63/0471 |
| 2017/0064815 A1 | 3/2017 | Hung | |
| 2019/0014176 A1* | 1/2019 | Tormasov | G06F 11/0727 |
| 2019/0281455 A1* | 9/2019 | Luo | H04W 12/06 |

* cited by examiner

*Primary Examiner* — Olugbenga O Idowu (57) ABSTRACT

Apparatus and method for device and data authentication in a computer network, such as but not limited to an IoT (Internet of Things) network. In some embodiments, a trust hub device is coupled to an interconnectivity device. The trust hub device includes a controller and non-volatile memory (NVM), and may be a network capable data storage device. The interconnectivity device is configured as an Internet of Things (IoT) or Operational Technology (OT) device, and includes a controller and a sensor. Data from the sensor are transferred from the interconnectivity device to the trust hub device. The trust hub device proceeds to attest a provenance of the data from the sensor to a remote entity associated with the interconnectivity device. The trust hub device includes a firewall to the external network, establishes a root of trust for the local interconnectivity device, and performs enrollment and signing services for the interconnectivity device.

9 Claims, 5 Drawing Sheets

CENTRAL TRUST HUB FOR INTERCONNECTIVITY DEVICE REGISTRATION AND DATA PROVENANCE

SUMMARY

Various embodiments of the present disclosure are generally directed to device and data authentication in a computer network.

In some embodiments, a trust hub device is coupled to an interconnectivity device. The interconnectivity device is configured as an Internet of Things (IoT) or Operational Technology (OT) device, and includes a controller and a sensor. Data from the sensor are transferred to the trust hub device. The trust hub device proceeds to attest a provenance of the data from the sensor to a remote entity associated with the interconnectivity device.

These and other features which characterize various embodiments of the present disclosure can be understood in view of the following detailed discussion and the accompanying drawings.

DETAILED DESCRIPTION

The present disclosure generally relates to authenticating devices and data in a computer network.

A recent advancement in computer network systems is sometimes referred to as the IoT (Internet of Things). The IoT can be viewed as a network of physical objects that have sensor and network capabilities that enable the objects to collect and exchange data concerning the surrounding environment. IoT devices can take a variety of styles and types of everyday objects such as home appliances, smart light bulbs, security cameras, doorbells, interactive consumer interfaces, and so on.

A related type of device is sometimes referred to as an Operational Technology (OT) device. OT devices tend to be integrated and used at a public infrastructure or business level and can include any number of sensors and control systems. Together, IoT and OT devices are often included in "City of the Future" style technologies where large scale interconnectivity is provided. For purposes of the present discussion, both IoT and OT style devices will be collectively referred to as "interconnectivity devices," or "I-T devices."

It is often necessary for interconnectivity devices in a particular location, such as a residence, to have access to a remote server or other entity to operate. In some cases, the remote entity is simply an initialization device that is required to establish the operation of the local device, such as via a registration service. In other cases, the remote entity is a data collection mechanism that collects information collected by the local interconnectivity device, such as hours used by a smart lightbulb, etc. In still other cases, the remote entity may be an active agent that cooperates and coordinates the operation of the local device, such as with certain types of voice activated consumer interfaces.

Regardless of the level of interaction, the local interconnectivity devices may communicate with the outside world through a local router or other connection point to the Internet. Depending on the style, type and number of devices, the communications may require significant amounts of resources, and the data collected may not be trustworthy as such are from an untrusted source. Further, there are often security concerns with such devices; personally identifying data may be undesirably transmitted by the interconnectivity devices, as well as the fact that the devices provide a potential attack path for an attacking party to breach the system and gain unauthorized access.

Various embodiments of the present disclosure are generally directed to an apparatus and method for providing device authentication and data provenance in a computer network. As explained below, a central trust hub device is coupled to a plurality of interconnectivity devices, such as IoT devices, in a selected location. The central trust hub device is generally configured to operate as a data provenance and protection box.

The trust hub device can take a variety of forms, such as a data storage device with network connectivity capabilities. Examples include a solid-state drive (SSD), a hard disc drive (HDD), a hybrid data storage device (HDSD), etc. Other forms can be used, including configurations that do not incorporate a data storage device.

The trust hub device establishes communications with each of the interconnectivity devices in the local network, and handles a variety of services including enrollment, registration of the devices, data collection, and data storage. Instead of the interconnectivity devices individually reaching out to the Internet to locate the corresponding entity/authority, these communications happen locally with the trust hub device. This provides security both upstream and downstream of the trust hub, since the trust hub handles sign and host operations for attestations, and can certify the provenance of data sent from the interconnectivity devices.

Collected data from the interconnectivity devices be appended with provenance information to attest to the remote client that the forwarded data is in fact correct and accurate. Sensitive data such as audio/video etc. can be encrypted or otherwise protected by the trust hub device before it is uploaded stored to the cloud. In this way, the trust hub device functions as a signing device within a root of trust at the local level, allowing provision offline and deployment online or offline.

Figure 1:
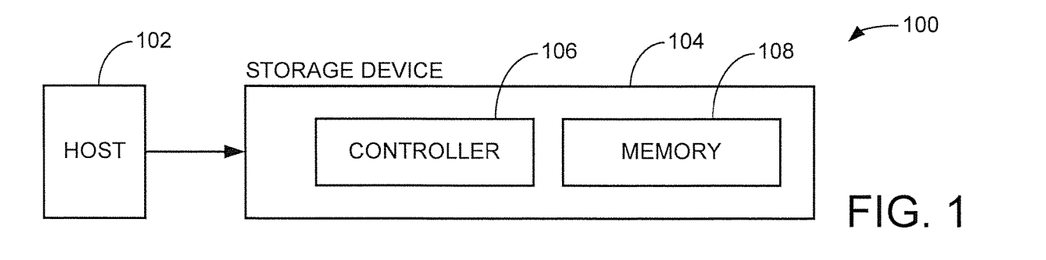
FIG. 1 depicts a data storage device constructed and operated in accordance with various embodiments of the present disclosure.

These and other features and advantages of various embodiments can be understood beginning with a review of FIG. 1 which shows a data processing system 100. The data processing system 100 includes a host device 102 operably coupled to a data storage device 104. This is merely exemplary as any number of different types of data processing environments can be used as desired, including environments that do not involve data storage systems.

The host device 102 and the data storage device 104 in FIG. 1 can each take a variety of forms. Without limitation, the host device 102 may take the form of a personal computer, workstation, server, laptop, portable handheld device, smart phone, tablet, gaming console, RAID controller, cloud controller, storage enclosure controller, local controller, etc.

The data storage device 104 may be a hard disc drive (HDD), solid-state drive (SSD), hybrid solid state drive (FISSD), thumb drive, optical drive, an integrated memory module, a multi-device storage enclosure, or some other form of device. The storage device 104 includes a controller 106 and memory 108. The controller 106 may be one or more programmable processors that utilize associated programming instructions (e.g., firmware, FW) to carry out top level control of the storage device. A hardware based controller can also be used. The memory 108 may include non-volatile memory (NVM) such as flash memory, rotatable data recording media, etc.

The data storage device 104 may be incorporated into the host device 102 as an internal component or may be an external component accessible via a communication pathway with the host device 102 including a cabling connection, a wireless connection, a network connection, etc.

For purposes of the present discussion, it will be contemplated that the host device 102 is a controller board and the data storage device 104 provides a main memory store for user data generated or forwarded by the host device, such as flash memory in a solid state drive (SSD). The SSD may be a single device, or may be grouped together with additional SSDs or other forms of storage device to support a mass storage environment.

Figure 2:
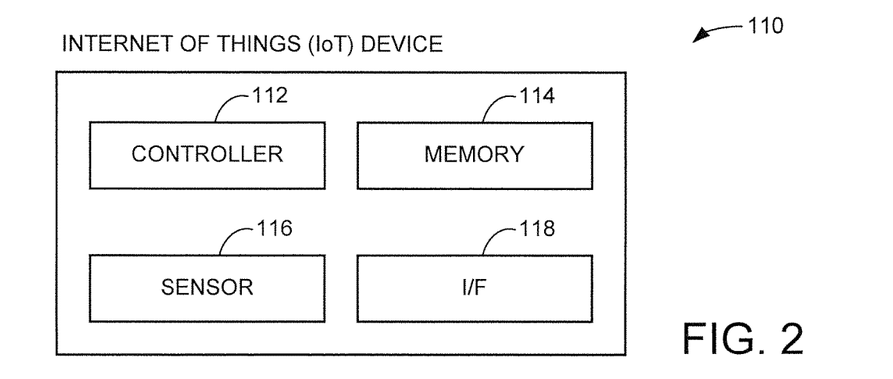
FIG. 2 shows an interconnectivity device characterized as an internet of things (IoT) device in some embodiments.

FIG. 2 shows an interconnectivity device 110, characterized as an IoT (Internet of Things) device in some embodiments. The IoT device 110 includes various "smart" processing, sensing and interconnectivity elements including a controller 112, controller memory 114, one or more sensors 116 and an interface (I/F) communication circuit 118. Other elements can be incorporated as required.

The controller 112 may be similar to the controller in FIG. 1, with the memory 114 providing memory space for the storage of data used or processed by the controller 112. The sensor 116 senses inputs of some selected type (e.g., visual, audible, vibratory, thermal, electrical, fluidic, etc.) from the surrounding environment. The I/F circuit 118 enables communication with an upstream device. The IoT device 110 can take any number of suitable forms such as, but not limited to, baby monitors, medical devices, home appliances, automotive sensors, voice activated consumer interfaces, smart light bulbs, valves, thermostats, security cameras, etc.

Figure 3:
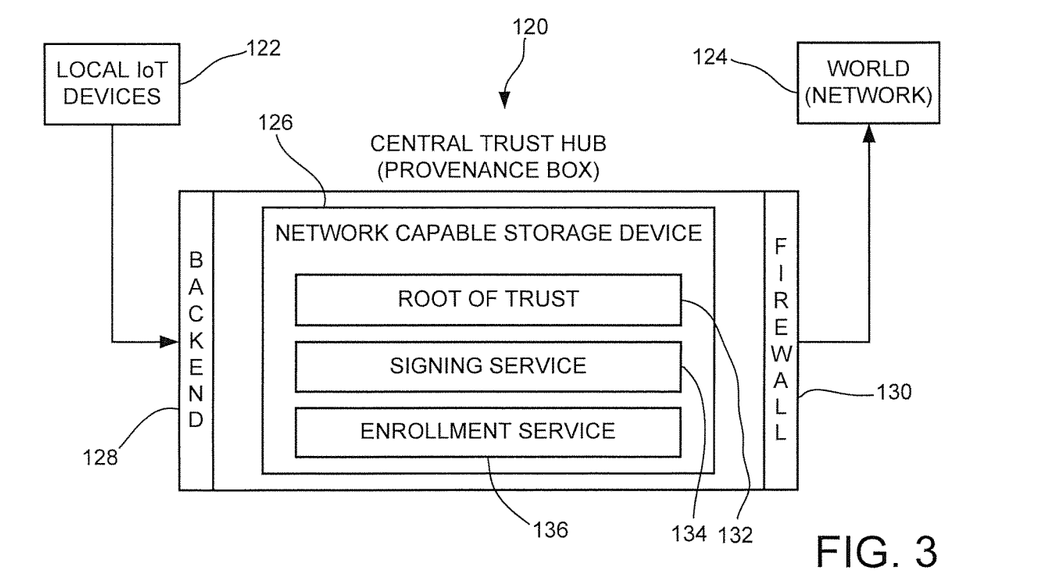
FIG. 3 shows a central hub device (provenance box) configured in accordance with some embodiments.

FIG. 3 shows a central trust hub device 120 constructed and operated in accordance with some embodiments of the present disclosure. Other configurations can be used, so FIG. 3 is merely exemplary and is not limiting. The central trust hub device 120, also sometimes referred to as a trust hub, a provenance box, etc., is operably coupled between one or more local IoT devices 122 similar to that shown in FIG. 2, and the outside world (e.g., an external network such as the Internet, etc.) 124.

The trust hub 120 includes a network capable storage device 126, which is similar to the storage device 104 in FIG. 1. As will be recognized by the skilled artisan, a network capable storage device has a capability of communicating directly via a network with remote devices using a suitable interconnection protocol (e.g., Ethernet, Fibre Channel, etc.) and is assigned a unique World Wide Identifier (WWID) value. A network capable storage device is not necessarily required, however. One or more additional controllers (not separately shown but as represented at 102 in FIG. 1) can be incorporated into the trust hub 120 as required to provide and direct these and other functions.

The trust hub 120 has a backend 128 to interconnect with the various IoT devices 122, and a firewall 130 to negotiate and protect communications with the outside world 124. These interfaces can be wired, wireless, etc. The backend 128 and firewall 130 can be incorporated directly into, or externally connected to and integrated with, the storage device 126. As will be recognized, a firewall comprises a network security system that monitors and controls incoming and outgoing network traffic based on a set of predetermined security rules; as such, the firewall provides a communication pathway to facilitate a network connection, while serving as a monitored barrier between a trusted internal network and an untrusted external network.

As explained below, the trust hub 120 is configured to locally process data exchanges between the IoT devices and the external network. To this end, the storage device 126 provides a number of services, including a root of trust 132, a signing service 134 and an enrollment service 136. These functions can be realized using localized firmware executed by one or more of the processors of the storage device 126.

Figure 4:
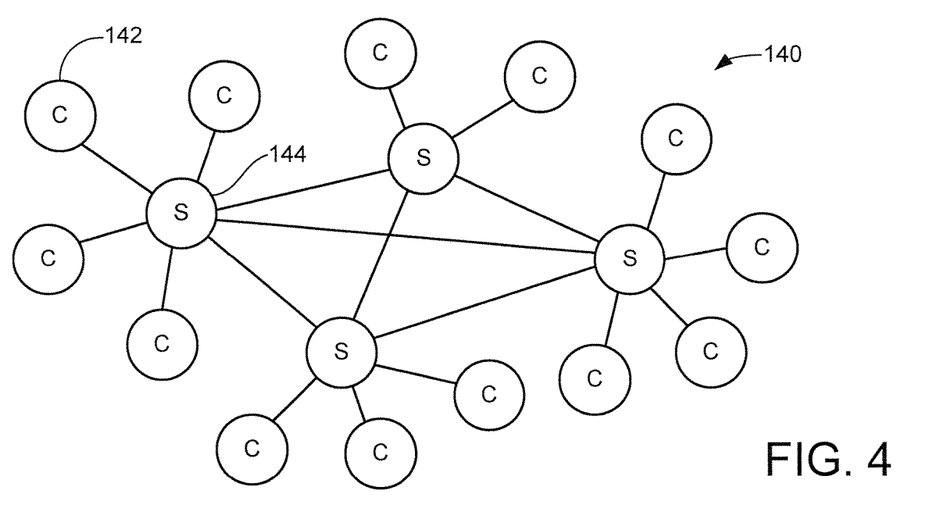
FIG. 4 represents a computer network to which the central hub device can be connected in some embodiments.

FIG. 4 is a simplified representation of a computer network 140. The network can correspond to the external network (world) 124 from FIG. 3. The network 140 has a number of interconnected processing nodes including client (C) nodes 142 and server (S) nodes 144. The client nodes may represent local user systems with host computers 102 and one or more storage devices 104 as depicted in FIG. 1, as well as the local arrangement of trust hubs 120 as depicted in FIG. 3. The server nodes may interconnect groups of remotely connected clients. Other arrangements can be used.

Generally, any node in the system can communicate directly or indirectly with any other node. The network 140 can be a private network, a public network, a combination of both public and private networks, the Internet, a cloud computing environment, etc. Local collections of devices can be coupled to edge computing devices that provide edge of network processing for larger data handling networks. It is contemplated that the overall network 140 is a low trust environment potentially susceptible to attacks by third parties. Authentication security schemes are implemented to protect against such attacks, as will now be described.

Figure 5:
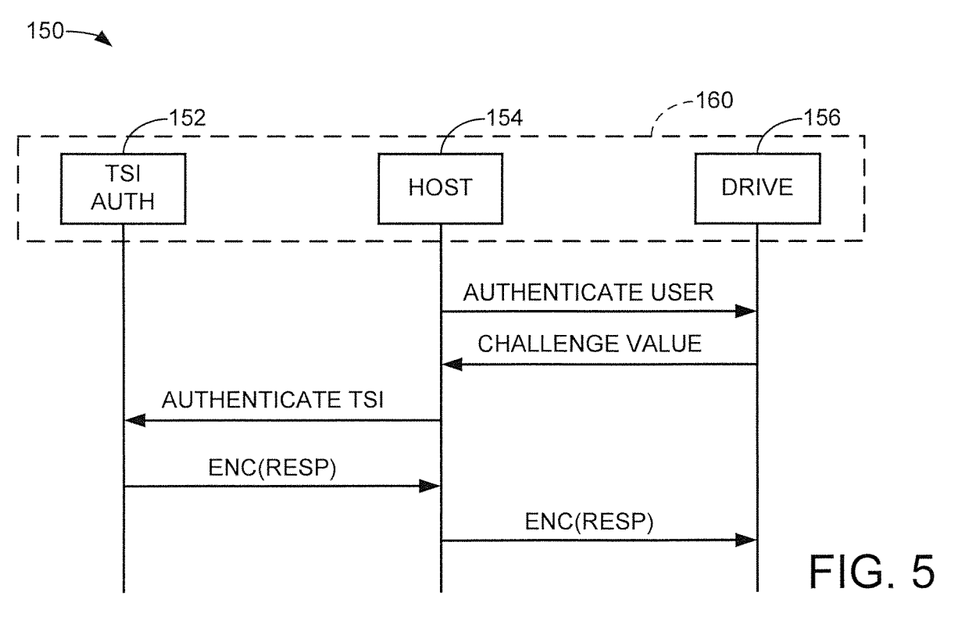
FIG. 5 is a sequence diagram illustrating an authentication transaction carried out using a remote trusted server within the network in some embodiments.

FIG. 5 is a generalized sequence diagram 150 illustrating a remote authentication sequence that may be carried out by aspects of the network 140 in accordance with some embodiments, including the trust hub 120 in FIG. 3. A trusted security infrastructure (TSI) 152, also sometimes referred to as the TSI authority or the TSI authority circuit, is a logical entity comprised of hardware and/or software designated to handle certain functions within the protection scheme. The TSI authority 152 may be a separate server dedicated to this purpose, or may be managed and distributed as required among various nodes by authorized system administrators (administrative users). The TSI authority 152 may form a portion of a remote security (key) management system in which system authentication techniques, including the transfer of encryption keys, certificates or other authentication data are passed to provide access to the system. The TSI authority communicates to a device using a selected security protocol.

A host 154 and a drive 156 (e.g., an SSD) are arranged to communicate with the TSI authority 152. Other forms of devices can be involved in the authentication process besides or in addition to the drive, such as an IoT device, etc.

In this example, the host 154 initiates a sequence to gain authorized access a protected security aspect of the drive 156. In order to do so, sufficient trust must be established between the TSI authority 152, the host 154 and the drive 156. To authenticate each of these entities to the others, the host 154 may initiate the process such as by requesting an encrypted challenge string from the drive 156. The host may supply an initial value which is encrypted by the drive, or some other sequence may be employed. The challenge value may be forwarded to the TS' Authority 152, which processes the challenge value in some way to provide an encrypted response, which may be processed by the host and the drive.

Once all entities are satisfied, mutual trust is established between the respective devices. This can be described as forming a trust boundary 160. Each entity within the trust boundary 160 trusts, and is trusted by, the other devices. At this point, selected transactions can safely take place. Examples include registrations of devices, accesses to secured volumes, diagnostic functions, firmware upgrades, security functions, data transfers, etc. Many such inter-entity sequences are generally known in the art, and substantially any suitable sequence can be used as desired.

While operable, the centralized system 150 of FIG. 5 is not always suitable for certain types of registration and authentication processing, such as in cases where there are many local devices. One such example is provided in FIG. 6 which shows a local control group 170 constructed in accordance with some embodiments.

The group 170 is exemplified as a local node of the network 140 of FIG. 4. The local group 170 includes a population of interconnectivity devices 172. These may be similar to the IoT devices 110, 124 discussed above in FIGS. 2-3. The devices 172 communicates with a central trust hub 174, which may be similar to the trust hub 120 from FIG. 3.

Figure 6:
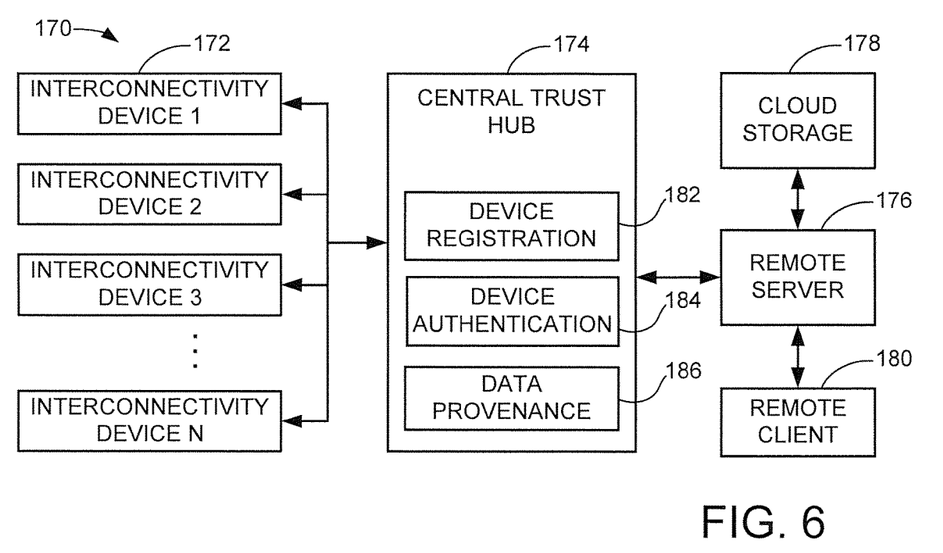
FIG. 6 is a functional block representation of a data processing system that can incorporate the IoT device of FIG. 2 and the central hub of FIG. 3 in some embodiments.

The trust hub 174 communicates via a network with a remote server 176. In some embodiments, the remote server 176 is a cloud server with associated cloud storage 178 configured to store data collected from the interconnectivity devices 172. A remote client 180 represents a user device used by a selected user to access the various devices in the system, including the storage and retrieval of data to and from the devices 172. Of particular interest are a device registration block 182, a device authentication block 184 and a data provenance block 186 of the trust hub 174. As explained below, these blocks represent hardware and/or programmable processor circuitry that operate to authenticate aspects of the system for the selected user.

The number N of local interconnectivity devices 172 can vary widely depending on the requirements of a given application, from values as low as a single device to values of several hundred or more. Groups of the devices 172 may be arranged into sub-collections to expedite authentication processing. The devices 172 may be arranged as required to communicate via a wired or wireless network or other connection with the hub device 174.

For local groups such as 170, it may not be feasible or desirable to undergo remote authentication of each of the devices 172 in the collection in the manner set forth by FIG. 5 each time that the devices are initialized and brought online for operation. Depending upon the configuration of the interconnectivity devices, some form of connection with an authorized entity may be normally required in order to enable the devices to operate, meaning that a loss of network interconnectivity may result in a loss of operation (e.g., there is limited or no ability for "offline" operation). Another issue relates to device security, since direct connection at the device level to the network could potentially provide an attacker with an opportunity to breach the system using a direct or side-channel attack upon the devices or local hub.

Figure 7:
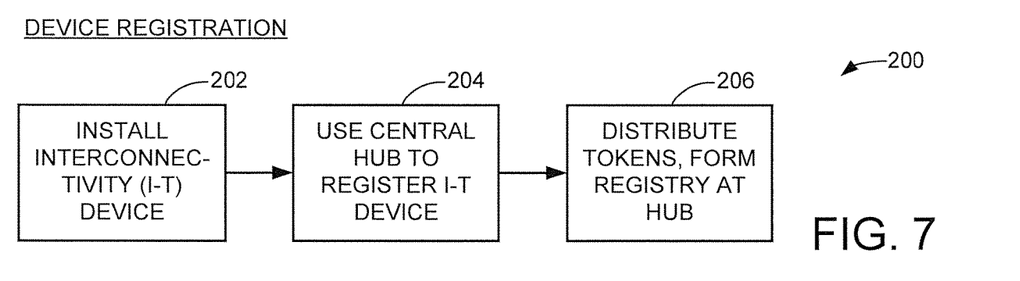
FIG. 7 is a sequence diagram for a device registration operation in some embodiments.
Figure 8:
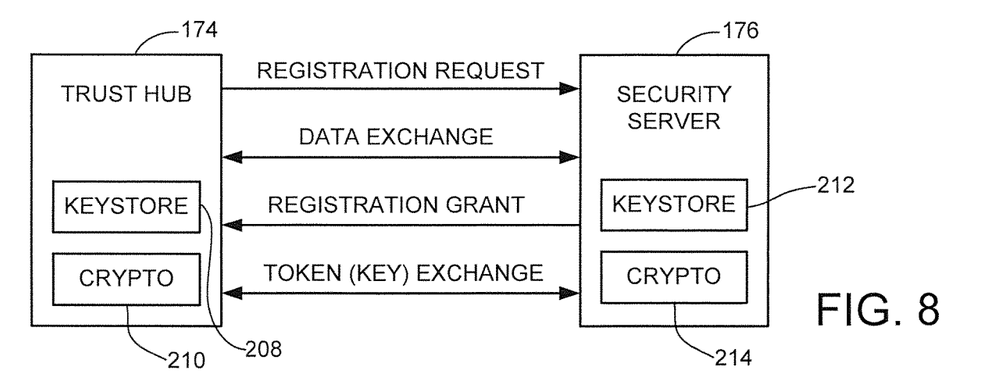
FIG. 8 depicts aspects of the device registration operation of FIG. 7.

FIGS. 7 and 8 show aspects of a device registration (enrollment) process 200 carried out to register the various interconnectivity (I-T) devices 172 using the trust hub 174 in some embodiments. Other sequences can be used. It will be appreciated that the process 200 is carried out each time that a new I-T device 172 is initially added to the local group and interconnected to the trust hub 174.

As shown by block 202, the device registration sequence includes an initial operation to install a selected I-T device 172. This may include a searching and linking operation in which the new I-T device is discovered by the trust hub 174 (or vice versa). Once a connection is obtained, information normally uploaded by the I-T device is forwarded to the trust hub 174, which handles the required exchanges with a remote server which serves as an authorized entity to enable registration of the I-T device, block 204. Block 206 shows that, upon successful registration, various tokens, registry entries, etc. may be updated by the trust hub 174.

FIG. 8 corresponds to FIG. 7 and shows interactions between the trust hub 174 and the remote server 176 (designated in this example as a security server). In some cases, the normal server(s) that process the data from the I-T devices may be the same as, or different from, the servers involved in the registration process.

A sequence as normally required by the I-T device is carried out, as mediated by the trust hub 174. It is contemplated that, because the trust hub is interposed between the I-T device and the external network, no direct communications will take place between the security server 176 and the I-T device 172. Instead, a normal registration process in accordance with the requirements associated with the I-T device is mediated by the trust hub. Upon registration, various control information such as in the form of authorization tokens (e.g., keys, etc.) are exchanged as required.

Depending on the configuration of the I-T device, authentication processing may take place as described above in FIG. 5. To this end, the trust hub 174 may include a local keystore 208 which serves as secure memory for authentication information. This may be incorporated as a portion of the root of trust discussed above. The local keystore may be internal memory within an SOC (system on chip) integrated circuit device, or may represent some other form of secure memory within the trust hub.

A crypto block 210 provides any requisite cryptographic functions necessary to successfully complete the registration process. These functions can include encryption, generation of hash values, digital signatures, etc. necessary to perform the enrolling and signing functions discussed above. The security server 176 may similarly include a keystore 212 and crypto block 214 for similar purposes.

Figure 9:
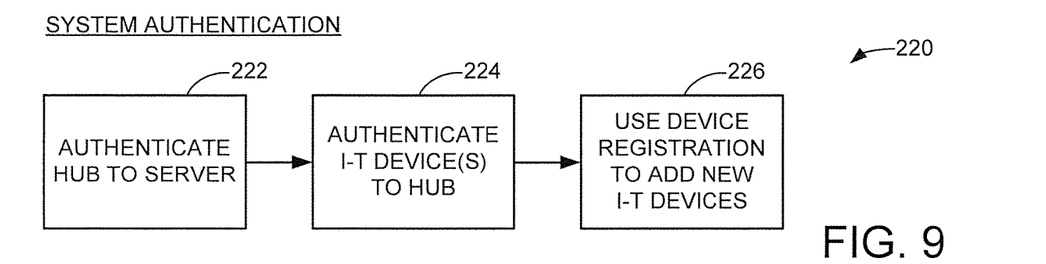
FIG. 9 is a sequence diagram for a system authentication operation in some embodiments.
Figure 10:
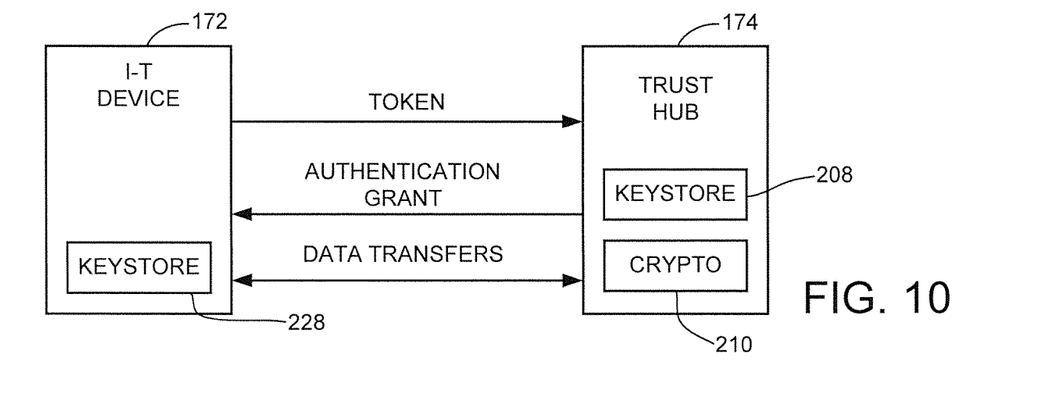
FIG. 10 depicts aspects of the system authentication operation in some embodiments.

FIGS. 9 and 10 show aspects of a system authentication process 220 carried out by the group 170 of FIG. 6 in some embodiments. Other operations can be used as desired. It will be appreciated that this will be carried out on each I-T device in the group, sequentially or in parallel.

At block 222, the trust hub is authenticated to a remote server, such as the security server 176 in FIG. 8. This can be carried out in a variety of ways, and may not be strictly necessary in some embodiments. If required, a TSI authority type sequence can be efficiently carried out as described in FIG. 5.

Next, block 224 shows a local authentication of the various I-T devices 172 with the trust hub 174. This is a localized authentication so that communications normally required over the external network are handled locally by the trust hub. Block 226 shows that if, as part of the initialization process, any new devices are detected, the new devices are registered as described above. While not shown in FIG. 9, any missing devices may be noted, potentially prompting further action by a user or other administrator to determine if the device is offline, has failed, has been removed from service, etc.

FIG. 10 shows one example sequence that may be carried out to authenticate a selected I-T device 172. Data exchanges such as tokens or other information are swapped between the I-T device 172 and the trust hub 174. It is noted that no upstream communications take place from the hub to the rest of the network; all required information for authentication purposes is stored in the local keystore 208 of the trust hub 174. As required, local data may further be stored in a secure keystore 228 of the I-T device 172.

In some embodiments, the trust hub 174 maintains a device list in the device authentication module 184. The device list maintains a list of all of the I-T devices 172 in the local group. Other authentication information can be included in the list as well, to enable a trust boundary to be established based on data exchanges between the I-T devices and the trust hub. The trust hub can utilize the list in a variety of ways, including periodically ensuring that all listed devices (or those devices identified as operational) are still present and functioning through subsequent and periodic security data exchanges (e.g., tokens, etc.).

Figure 11:
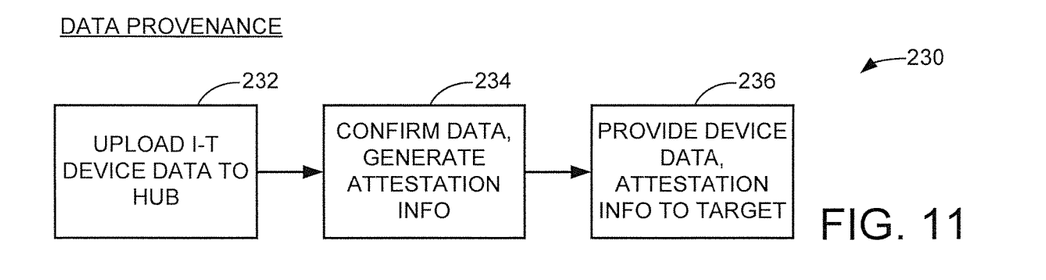
FIG. 11 is a sequence diagram for a data provenance operation in some embodiments.
Figure 12:
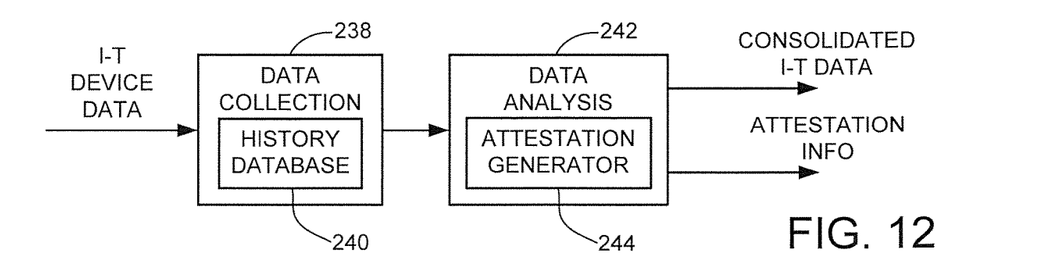
FIG. 12 depicts aspects of the data provenance operation in some embodiments.

FIGS. 11 and 12 show a data provenance process 230. This relates to normal operation of the control group 170 from FIG. 6 during which the various I-T devices collect and exchange data. Generally, the data provenance process operates to enable the hub 174 to collect, analyze and attest to the validity of the data that are forwarded to an end user, such as the client 180 in FIG. 6. Other data processing operations can take place as well, such as encryption and signing of the uploaded data, etc.

Block 232 shows that collected data are uploaded from a selected I-T device 172 to the trust hub 174. This can be carried out in a variety of ways, depending on the configuration of the I-T device. In some cases, the I-T device may collect and output data at a regular rate, such as a security camera that outputs frames of an A/V signal from a monitored location at a recurring rate. In other cases, the I-T device may output data responsive to a particular action, such as a doorbell, an appliance, etc. that is activated by a user. In still other cases, the I-T device may operate in the background to collect data locally at the device and only upload the data when requested, such as for certain types of temperature or other environmental/operational monitors. The type and rate at which data are uploaded are not important, and the hub can be configured to request data as required.

Block 234 shows a data validation operation that is carried out by the trust hub 174. The validation operation confirms the data were received from the associated I-T device 172. This can include handshakes or other authentication tokens, etc. being exchanged between the I-T device and the hub as required along with the transfer of the collected data. Other confirmation operations can take place to ensure, to the hub, that the data have been presented from the associated I-T device.

Attestation information (info) is further generated at block 234 as required. As explained below, the attestation info serves to confirm the validity of the data, including by serving, as a chain of evidence style provenance indicator (e.g., the data are correct and accurate, the data were supplied from a particular source at a certain date/time, etc.). At block 236, the collected device data and attestation information are thereafter transferred across the external network to a target, such as to a requesting client, to cloud storage, etc.

FIG. 12 shows aspects of the trust hub 174 in some embodiments to carry out the data provenance operation of FIG. 11. A data collection module 238 serves to receive and accumulate the various types of data supplied by the respective I-T devices 172. The collected data may be stored, temporarily or permanently, in a local history database 240. In the embodiment of FIG. 3, the NVM of the storage device 126 (e.g., flash, rotatable media) may be used to provide archived local storage of the collected data.

A data analysis module 242 evaluates the collected data in the manner discussed above, and includes an attestation generator 244 to generate the attestation information. The respective data collection and analysis modules 238, 242 can take a number of forms, including programming instructions (FW) executed by the storage device controller, or by a separate circuit of the provenance box as desired.

Figure 13:
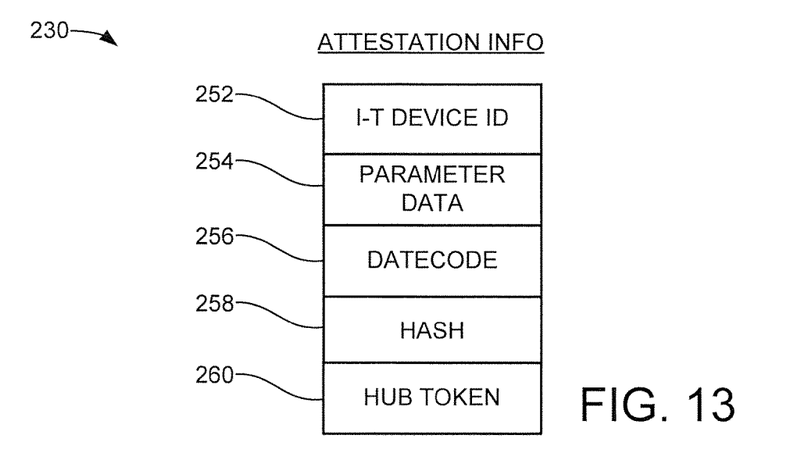
FIG. 13 is an exemplary format for authentication information (info) generated by the circuitry of FIG. 12.

FIG. 13 is an example format for a block of attestation information (info) 250 generated by the circuitry of FIG. 12 in some embodiments. Other formats can be used so that the format is merely for purposes of illustration and is not limiting. It is contemplated that the attestation info 250 will be fixed size block of data that is transferred with or otherwise associated with corresponding data transferred from the hub to the target.

Fields include an I-T device ID field 252, parameter data field 254, a datecode field 256, a hash field 258 and a hub token field 260. The I-T device ID in field 252 provides an identification value to indicate the source of the corresponding data. The parameter data from field 254 can take any useful form, including environmental or parametric data associated with the collected data.

The datecode from field 256 may be a date/time stamp that indicates a relevant time associated with the data, such as when the data were collected/uploaded, etc. The hash in field 258 may be a hash or other type of cryptographic indication that can be used to authenticate the transferred data. The hub token in field 260 may be a unique identifier associated with the hub (including established during an earlier registration or authentication process) to signify to the end target the validity of the transferring hub. In this way, the receiving target can be assured of the validity, source and other provenance data associated with the transfer.

Figure 14A:
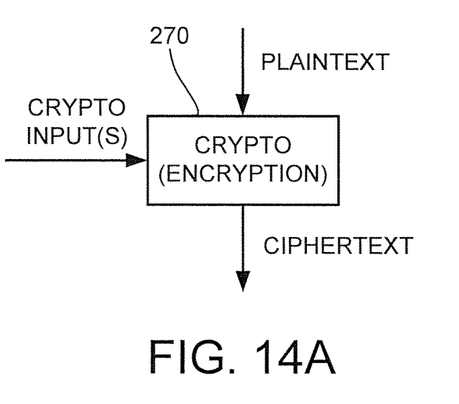
FIGS. 14A and 14B show different configurations of the crypto blocks used during the respective operations of FIGS. 7-12 in some embodiments.
Figure 14B:
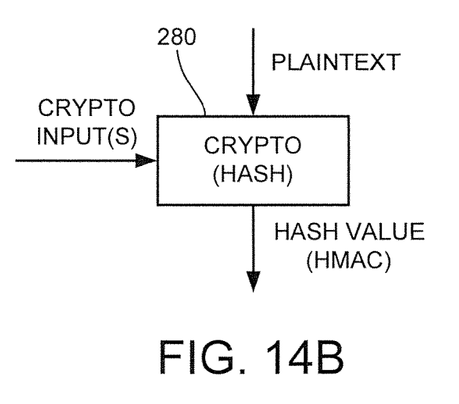

FIGS. 14A and 14B have been provided to illustrate different forms of cryptographic protection that can be used by the trust hub described herein in some embodiments.

Without limitation, these and other blocks can be incorporated into the crypto block 210, as well as in other aspects of the system.

FIG. 14A shows a crypto block 270 characterized as an encryption/decryption block. In this case, input plaintext data are modified using a suitable encryption function based on various crypto inputs (such as an encryption key, token, seed value, counter value, etc.) to generate output ciphertext. If a symmetric encryption function is applied, then presentation of the ciphertext back as the input and the same crypto inputs will return the originally generated plaintext. It is contemplated that the various tokens and other information disclosed herein can be used not only during the authentication process, but can further be used during normal data transfer operations, such as via the encryption/decryption of transferred data, etc. It will be appreciated that the reference to plaintext can include previously generated ciphertext using an upstream encryption process.

FIG. 14B shows another crypto block 280 that can be used in some embodiments by the various devices. The crypto block 280 is characterized as a hash block which applies a suitable hash function (e.g., a secure hash algorithm, SI-IA) using input plaintext and, as required, various crypto inputs to generate an output hash value (hash-based message authentication code, HMAC). While not transforming the plaintext as in FIG. 14A, the hash block 280 can advantageously use a crypto input, such as one or more of the tokens or other information discussed above, as a value to generate a corresponding hash value that can be transferred or stored with the plaintext data to assure that no tampering has occurred with the plaintext data.

Figure 15:
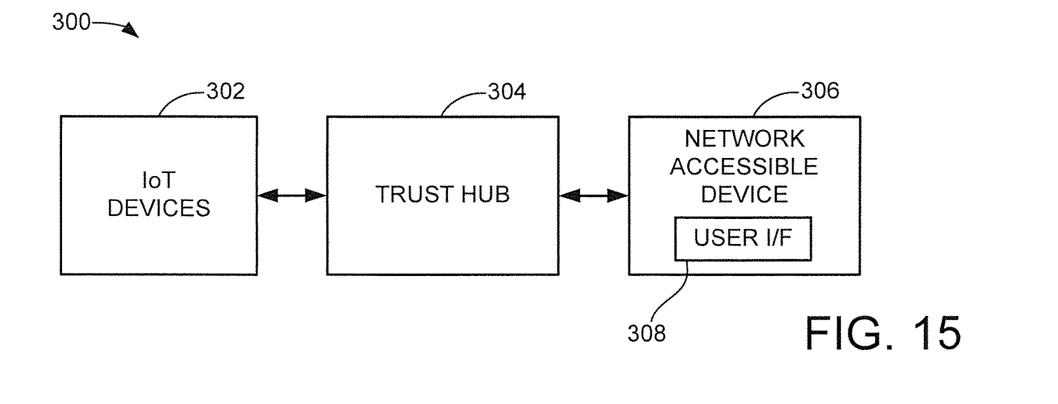
FIG. 15 shows another data processing system with a population of interconnectivity devices and a trust hub configurable by a user in accordance with further embodiments.

FIG. 15 shows another system 300 similar to the system described above in FIG. 6. The system includes a population of IoT devices 302, a trust hub 304 and a local network accessible device 306. The local network accessible device 306 may be a smart phone, a tablet, a computer, a smart television, etc. used by the local user who also owns and manages the devices 302 and trust hub 304. Suitable communication pathways are arranged to enable the user to communicate with the IoT devices 302 and/or the trust hub 304 via a user interface 308 of the device 306.

FIG. 15 illustrates that the centralized nature of the trust hub 304 can enhance user privacy and security. Instead of specifically identifying the individual IoT devices 302, this information can be expressly removed, along with other identifying information. For example, the user may not wish a geolocation or other information associated with the IoT devices to be included in data updates that are uploaded to the network. In such case, the trust hub can be configured to remove such information, or to insert default (or more generalized) information into the stream.

In this way, the user can be assured of the validity and accuracy of the data without transferring additional information that are not pertinent to the evaluation at hand. These and other system modifications can be carried out using a suitable application programming interface (API) of the network accessible device 306.

The trust hub 304 can be configured to operate with substantially any style and type of IoT and OT device. Enrollment and operational data exchanges can be monitored and emulated locally as required. Attempted communications, such as silent upgrades or data pulls can be intercepted by the firewall 130, and as required, a suitable response can be supplied to the requesting party, including a (user selected) device not available style communication, etc. In this way, continued operation of the IoT and OT devices can be carried out without allowing or requiring a direct connection to a remote device.

It will now be appreciated that the various embodiments discussed herein can provide a number of benefits. Using a local trust hub to generate a root of trust and handle enrollment, attestation, data provenance, security and other functions enables enhanced operation of a population of interconnectivity devices, such as IoT and/or OT devices, in a fast and secure manner. Data supplied by the devices can be attested to and certified, leading, to better resource utilization and management. Interconnectivity devices that normally require continuous connection to a remote entity (e.g., a remote server) can now be operated in an "offline" fashion, in that any required data exchanges (including heartbeat signals, etc.) can be supplied locally by the trust hub.

While various embodiments have contemplated the use of a network capable storage device, such as an SSD or HDD, as forming the core of the trust hub, other configurations can be used.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A method comprising:
coupling a trust hub device to an interconnectivity device, the interconnectivity device configured as an Internet of Things (IoT) or Operational Technology (OT) device having a controller and a sensor;
transferring data from the sensor to the trust hub device;
attesting, by the trust hub device to a remote entity associated with the interconnectivity device, a provenance of the data from the sensor by generating corresponding attestation information comprising a chain-of-evidence verification of the data transferred from the sensor to the trust hub device, the corresponding attestation information comprising a unique hub token value associated with the interconnectivity device and a datecode value associated with a time at which the data was collected or transferred by the interconnectivity device to the trust hub device; and
concurrently transferring the data and the corresponding attestation information from the trust hub device to the remote entity.

2. The method of claim 1, wherein the trust hub device comprises a data storage device comprising a controller and a non-volatile memory (NVM).

3. The method of claim 2, wherein the data storage device is characterized as a network capable data storage device configured to communicate with a remote device using a suitable interface protocol and having a unique World Wide Identifier (WWID) value, and wherein the data and the corresponding attestation information are transferred to the remote entity.

4. The method of claim 1, wherein the trust hub device is configured to register the interconnectivity device with a remote registration entity and store local security information in a local keystore, the local security information subsequently used to locally authenticate the interconnectivity device without further communications with the remote registration entity.

5. The method of claim 1, wherein the trust hub device is configured to perform a remote authentication of the trust hub device with a secure server across an external network, and to perform a remote authentication of the interconnectivity device via a local connection between the trust hub device and the interconnectivity device without accessing the external network.

6. The method of claim 1, wherein the corresponding authentication information further includes an output cryptographic value generated using a cryptographic function in relation to the transferred data.

7. The method of claim 1, wherein the data transferred from the interconnectivity device to the trust hub device includes personally identifying information associated with a user of the interconnectivity device, and the trust hub device removes the personally identifying information prior to transfer of remaining portions of the data to the remote entity.

8. The method of claim 1, wherein the data transferred from the interconnectivity device to the trust hub device comprises a continuous stream of visual or audible data.

9. The method of claim 1, wherein the data transferred from the interconnectivity device to the trust hub device comprises data that are collected in a memory of the interconnectivity device, and the method further comprises transferring the data responsive to a request issued by the trust hub device.

* * * * *